United States Patent [19]
Gielkens et al.

[11] Patent Number: 5,377,062
[45] Date of Patent: Dec. 27, 1994

[54] RECORDING AND/OR REPRODUCING APPARATUS FOR A MAGNETIC-TAPE CASSETTE

[75] Inventors: Marc Gielkens; Johann Veigl, both of Vienna, Austria

[73] Assignee: U.S. Philips Corporation, New York, N.Y.

[21] Appl. No.: 48,083

[22] Filed: Apr. 15, 1993

[30] Foreign Application Priority Data

Jul. 7, 1992 [AT] Austria ................... 1389/92

[51] Int. Cl.⁵ ..................... G11B 5/008; G11B 15/675
[52] U.S. Cl. ...................................... 360/96.5; 360/93
[58] Field of Search ................ 360/96.5, 96.6, 93

[56] References Cited

U.S. PATENT DOCUMENTS

| | | | |
|---|---|---|---|
| 4,807,067 | 2/1989 | Spiegelstein | 360/93 |
| 4,945,431 | 7/1990 | Kunze | 360/96.5 |
| 5,231,553 | 7/1993 | Weber et al. | 360/96.5 |

FOREIGN PATENT DOCUMENTS

| | | |
|---|---|---|
| 0434143 | 12/1990 | European Pat. Off. . |
| 0480514 | 4/1992 | European Pat. Off. . |
| 0480515 | 4/1992 | European Pat. Off. . |
| 61-194670 | 8/1986 | Japan ............ 360/99.6 |
| 63-14359 | 1/1988 | Japan ............ 360/96.5 |

*Primary Examiner*—John H. Wolff
*Attorney, Agent, or Firm*—William L. Botjer

[57] ABSTRACT

An apparatus (1) for a magnetic-tape cassette (2) having a movable shutter (16) for closing at least one access opening (10, 11, 12) in a side wall (6) of the cassette (2) comprises a cassette holder (25) for receiving the cassette (2) and an actuating device (77) for moving the shutter (16) of the cassette (2). The apparatus (1) has a movable cassette hold-down device (60) which comprises a hold-down support (66) which at least partly covers the upper wall (4) of the cassette (2), and the actuating device (77) is movably supported on the hold-down support (66).

8 Claims, 5 Drawing Sheets

RECORDING AND/OR REPRODUCING APPARATUS FOR A MAGNETIC-TAPE CASSETTE

BACKGROUND OF THE INVENTION

The invention relates to a recording and/or reproducing apparatus for a magnetic-tape cassette comprising a rectangular housing having an upper wall, a lower wall and four side walls, at least one of said side walls having at least one access opening, and a shutter for closing the access opening, which shutter is movable between a closed position and an open position, which apparatus comprises a chassis, a cassette holder supported on the chassis and adapted to receive a cassette, and an actuating device adapted to move the shutter of the cassette held by the cassette holder, which actuating device comprises a supporting member, at least partly covering the upper wall of the cassette, and an actuating member which projects from the supporting member and which is engageable with the shutter of the cassette, which actuating member controls the movement of the shutter during a relative movement between said actuating member and the shutter.

Such an apparatus of the type defined in the opening paragraph is known, for example, from EP 0,434,143 A2. In this known apparatus the actuating member for controlling the process of opening and closing the shutter has been provided on the cassette holder, the actuating device being movably supported on the cassette holder. In order to ensure that the shutter is opened and closed reliably the actuating member of the actuating device and the shutter of the cassette should cooperate with one another within narrow positional tolerances. However, in the known apparatus the position of the actuating member of the actuating device and the shutter of the cassette relative to one another depends on several parameters, viz. in the first place the position of the cassette in the cassette holder, i.e. on the positioning elements supporting the cassette, in the second place the dimensions of the cassette inserted into the cassette holder, and in the third place the position of the actuating member in relation to the cassette holder. It may then occur, for example, that a cassette does not lie snugly on the cassette holder or on the positioning elements, that a cassette dimension which is essential for opening and closing the cassette shutter deviates distinctly from a specified nominal value, and that the actuating member of the actuating device is situated comparatively far from a nominal position. In the event of an unfavourable coincidence of these situations, i.e. the event of an unfavourable combination of the tolerance-dependent parameters which govern a reliable opening and closure of the shutter, it may occur that the actuating member of the actuating device fails to cooperate with the cassette shutter, for example, when this shutter is to be opened. Thus, in the case of unfavourable tolerance conditions the known apparatus does not provide a correct actuation of the shutter of a cassette.

SUMMARY OF THE INVENTION

It is an object of the invention to preclude the above problems and to guarantee a correct actuation of the shutter of a cassette in an apparatus of the type defined in the opening paragraph. To this end the invention is characterised in that there is provided a movably supported hold-down device comprising a hold-down support which is movable into a position in which it at least partly covers the upper wall of the cassette and which comprises at least one hold-down member which can be applied to the upper wall of the cassette, and by means of which a cassette inserted into the cassette holder can be pressed against the cassette holder with its lower wall after the hold-down member has been applied to its upper wall, and the actuating device is movably connected to the hold-down support of the hold-down device and, after the hold-down member has been applied to the upper wall of the cassette, the actuating member of the actuating device is engageable with the shutter of the cassette. Thus, it is achieved very simply that the upper wall of a cassette inserted into the cassette holder, whose shutter is to be opened or closed, forms a reference surface to define the position of the shutter actuating device relative to the cassette, as a result of which the relative position of the actuating member of the actuating device with respect to the cassette shutter lies within a very narrow tolerance range. This very narrow tolerance range of said relative position nearly always ensures a reliable actuating function for the cassette shutter.

In an apparatus for a magnetic-tape cassette comprising a shutter which is slidable along a side wall of this cassette parallel to a first direction of movement it is found to be advantageous if the cassette holder is movably supported on the chassis and is movable between a loading position and an intermediate position in a direction parallel to the upper wall of the cassette and parallel to the first direction of movement and between the intermediate position and an operating position in a direction perpendicular to the upper wall of the cassette, the hold-down support is supported on the chassis so as to be movable substantially perpendicularly to the upper wall of the cassette and, when the cassette holder is moved from its loading position to its intermediate position, the hold-down member of said hold-down support is applied to the upper wall of the cassette, and there is provided a control device for the actuating device supported by the hold-down support of the hold-down device, which control device causes the actuating device to assume a position for the cooperation of the actuating member with the shutter of the cassette when the cassette holder is moved parallel to the first direction of movement from its loading position to its intermediate position after the hold-down member has been applied to the upper wall of the cassette, in order to move the shutter parallel to the first direction of movement from its closed position to its open position. In this way it is achieved that a cassette can be pulled automatically into the apparatus and brought to a tape-transport and scanning device accommodated in the apparatus, the shutter, which is slidable along a side wall of the cassette, being opened while the cassette is being pulled into the apparatus.

It is also found to be advantageous if the hold-down support of the hold-down device is essentially formed by a hold-down plate which at least largely covers the upper wall of the cassette when the hold-down member has been applied to the upper wall, and the actuating device which is movably supported on the hold-down plate comprises a substantially plate-shaped actuating lever which is arranged to extend parallel to the hold-down plate and is supported on the hold-down plate so as to be pivotable about a pivot. Such a construction is advantageous in order to realise an apparatus of minimal overall height.

Moreover, it is found to be advantageous if an actuating pin forming the actuating member and a control projection adapted to cooperate with the control device for the actuating device project substantially perpendicularly from the plate-shaped actuating lever. This is advantageous for a simple construction and for a reliable cooperation between the actuating device and the shutter.

The control device for the actuating device may be constructed, for example, for rigidly controlling the operation of the actuating device. However, it is found to be advantageous if there is provided an actuating spring for the actuating lever, which spring acts upon the hold-down plate and upon the plate-shaped actuating lever, and the control device for the actuating device comprises an inclined control wall against which the control projection of the actuating lever can be pressed by the force of the actuating spring. Such a construction is advantageous for a non-critical engagement of the actuating member of the actuating device with the shutter of a cassette.

It is found to be particularly advantageous if the pivot between the plate-shaped actuating lever and the hold-down plate is formed by a pin-and-slot joint, and the pin is movable in the slot parallel to the first direction of movement. In this way it is achieved that wile the shutter is held in its open position by the actuating member the actuating device cannot exert any external forces on the cassette.

BRIEF DESCRIPTION OF THE DRAWINGS

The invention will now be described in more detail with reference to the drawings which show an exemplary embodiment to which the invention is not limited.

DETAILED DESCRIPTION OF THE PREFERRED EMBODIMENT

Figure 1:
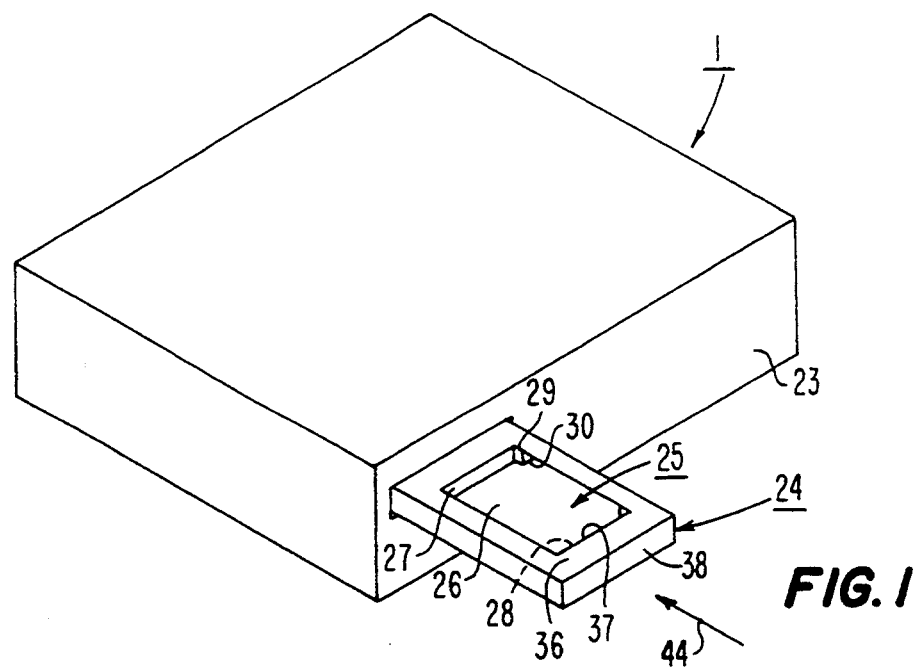
FIG. 1 is a diagrammatic oblique view of a recording and reproducing apparatus for a Cassette accommodating a record carrier in the form of a magnetic tape, which apparatus comprises a cassette holder for receiving the cassette, which holder has been provided on a drawer which can be slid into and out of the apparatus.

FIG. 1 shows diagrammatically a recording and reproducing apparatus 1 constructed for recording and reproducing information signals, for example speech signals or music signals, on/from a magnetic tape. The magnetic tape is accommodated in a cassette 2, which is shown diagrammatically in FIGS. 2 and 3 and which is shown only in dash-dot lines in FIGS. 4 to 9.

Figure 2:
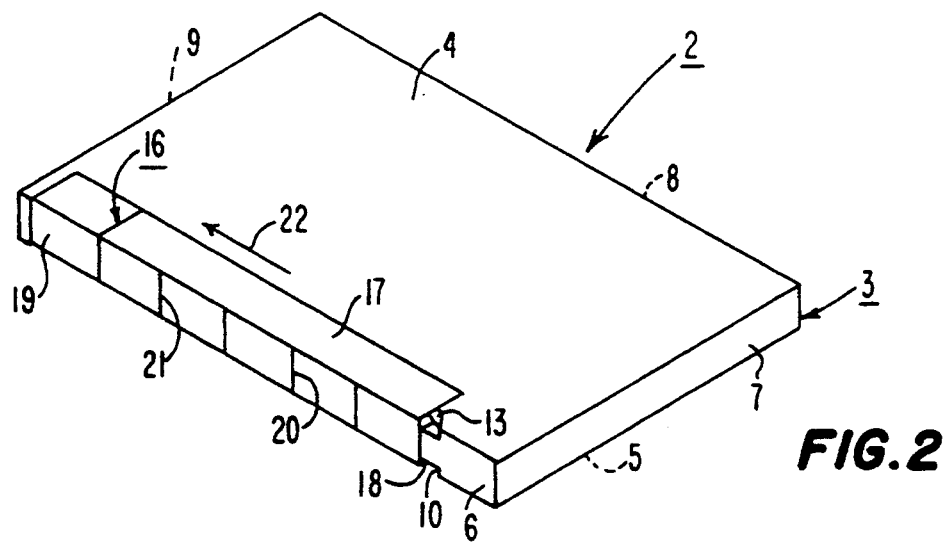
FIG. 2 is a diagrammatic oblique view of a cassette which can be loaded into the apparatus shown in FIG. 1 and which comprises a shutter which is movable between a closed position and an open position and which is shown in its closed position in FIG. 2.
Figure 3:
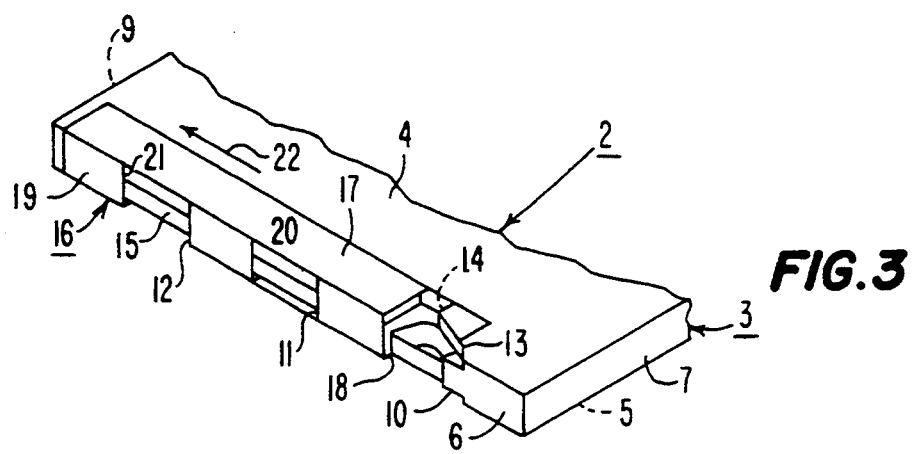
FIG. 3 shows the cassette of FIG. 2 in the same way as in FIG. 2, the cassette being partly cut-away and the shutter being shown in its open position.

The cassette 2 has a rectangular housing 3 having an upper wall 4, a lower wall 5, not shown in FIGS. 2 and 3, and four side walls 6, 7, 8 and 9, the two side walls 8 and 9 neither being shown in FIGS. 2 and 3. The long front-side wall 6 of the housing 3 of the cassette 2 has three access openings 10, 11 and 12. The access opening 10 also extends into the upper wall 4 and into the bottom wall 5 of the housing 3 of the cassette 2 and at the location of the upper wall 4 the access opening 10 is bounded by an angular wall portion 13 which is inclined relative to and terminates in the side wall 6 and which adjoins a wall portion 14, not shown in FIGS. 2 and 3, which extends perpendicularly to the side wall 6. The access opening 12 also extends into the lower wall 5 of the housing 3 of the cassette 2. The access openings 10, 11, and 12 provide access to the magnetic tape 15, which is accommodated in the cassette 2 and extends between two rotatable reel hubs, not shown, for at least one magnetic head, which can pass through the access opening 11, and for two pressure rollers, which can cooperate with the magnetic tape 15 through the access openings 10 and 12 and thereby press the magnetic tape 15 against capstans, which are engageable behind the magnetic tape 15 through the parts of the openings 10 and 12 in the cassette 2 which are situated in the lower wall 5.

The cassette 2 has a shutter 16 for closing the access openings 10, 11 and 12. The shutter 16 is formed by a sheet-metal part of substantially U-shaped cross-section and comprises a plate-shaped first flange portion 17 extending parallel to the upper wall 4, a plate-shaped second flange portion 18 extending parallel to the lower wall 5, and a plate-shaped connecting portion 19 extending parallel to the long side wall 6 at the front. The connecting portion 19 has two windows 20 and 21, the window 21 also extending into the second flange portion 18. The U-shaped shutter 16 is movable along the side wall 6 parallel to a first direction of movement, indicated by an arrow 22 in FIGS. 2 and 3, between a closed position shown in FIG. 2 and an open position shown in FIG. 3 and vice versa, the shutter 16 being guided to be slidable in opposite directions between these two positions, but this will not be described in further detail here. At the location of the second flange portion 18 a return spring, which is not shown and which is arranged between the second flange portion 18 and the lower wall 5, acts upon the shutter 16 and thus urges the shutter 16 into its closed position. With respect to the cassette 2 it is to be noted that such a cassette is known, for example, from EP 0,434,143 A2, EP 0,480,514 A2 and EP 0,480,515 A2, herewith incorporated by reference.

As can be seen in FIG. 1, the apparatus 1 has a drawer 24 which can be slid out of the apparatus 1 through an opening in the front wall 23 of the housing of the apparatus 1 into an end position shown in FIG. 1 and, oppositely, into the apparatus 1 through the opening in the front wall 23 up to an end position inside the apparatus. A cassette holder 25 for receiving a cassette 2 is movably supported on the drawer 24, as will be described in detail hereinafter with reference to FIGS. 5 to 7. The cassette holder 25 is substantially trough-shaped and has a bottom wall 26 with openings not shown in FIG. 1 and two short side walls 27 and 28, FIG. 1 showing only a side wall 27, and a two long side walls, of which only the side wall 29 is shown in FIG. 1. The side wall 29 has an opening 30 at whose location the side wall 6 with the openings 10, 11 and 12 of a cassette 2 is situated when the cassette 2 has been loaded into the cassette holder 25. Through the opening 30 in the side wall 29 of the cassette holder 25 said magnetic head and the pressure rollers can cooperate with the magnetic tape 15 in the cassette 2.

Figure 4:
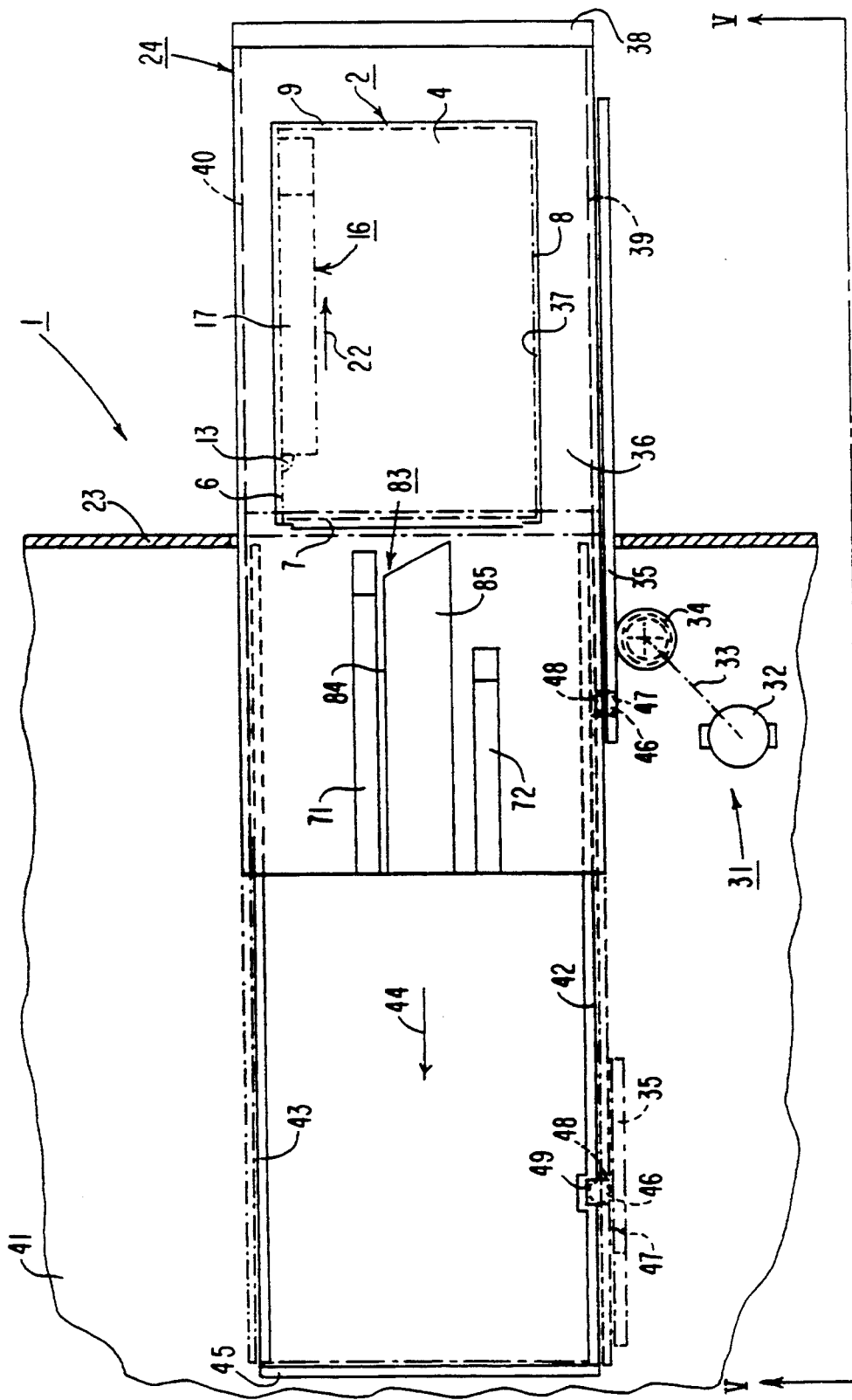
FIG. 4 shows a part of the apparatus of FIG. 1 in a diagrammatic plan view to a larger scale than FIG. 1 and with the apparatus largely cut-away, which part comprises the drawer of the apparatus shown in FIG. 1 and the drive means for this drawer, the drawer being shown in an end position in which it has been slid out of the apparatus.
Figure 5:
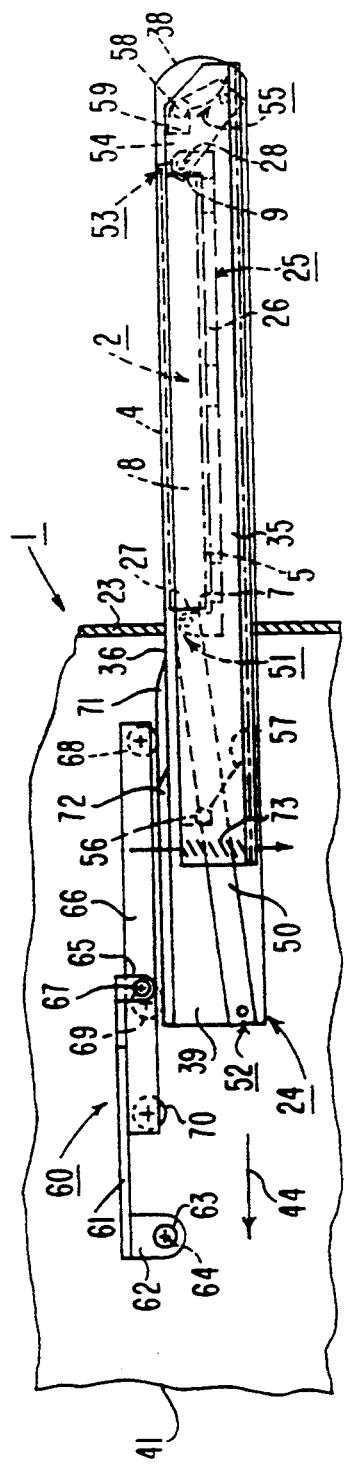
FIG. 5 is a diagrammatic side view 4 to the same scale as in FIG. 4 and taken on the line V—V in FIG. 4, showing the drawer of FIGS. 1 and 4, the cassette holder which is movably supported on this drawer, and a cassette hold-down device of the apparatus, the drawer again being shown in its end position in which it has been slid out of the apparatus, the cassette holder being shown in a loading position, and the cassette hold-down device being shown in a rest position.

When the drawer 24 of the apparatus 1 has been slid out of the apparatus 1, as is illustrated in FIGS. 1, 4 and 5, a cassette 2 can be inserted into the cassette holder 25, as a result of which the side wall 6 of the housing 3 of the cassette 2 faces the side wall 29 of the cassette holder 25. Subsequently, the drawer 24 can be moved into the apparatus 1, which in the present apparatus 1 is effected by driving the drawer 24 by means of a motor.

A drive means 31 for the motor-driven actuation of the drawer 24 will now be described with reference to FIG. 4. This drive means 31 comprises a motor 32 which can be started in opposite directions of rotation by actuating two buttons, not shown, which motor can drive a toothed drive wheel 34 via a transmission 33, shown diagrammatically as a dash-dot line, which drive wheel is in mesh with a toothed rack 35 coupled to the drawer 24.

The drawer 24 basically comprises an upper wail 36 having an opening 37 through which a cassette 2 can be inserted into the cassette holder 25, which is movably supported on the drawer 24. At its front the drawer 24 has a curved front wall 38. At its sides the drawer comprises two side wails 39 and 40. Between these two side walls 39 and 40 two guide strips 42 and 43 are connected to a diagrammatically shown chassis 41 of the apparatus 1, which guide strips extend perpendicularly to the chassis 41 and guide the drawer 24 to be movable parallel to the direction indicated by the arrow 44, i.e. parallel to the first direction of movement 22 of the shutter 16 of the cassette 2. At their ends which are remote from the front wall 23 of the housing of the apparatus 1 the two guide strips 42 and 43 are interconnected by an abutment strip 45 which limits the inward movement of the drawer 24 in the apparatus 1 and thus defines the end position of the drawer 24 when slid into the apparatus 1. It is to be noted that the other end position of the drawer 24, in which it has been slid out of the apparatus 1, is defined by means of an electrical switch, not shown, which is actuated and turns off the motor 32 when this end position of the drawer 24 is reached.

The toothed rack 35 is guided on the side wall 39 of the drawer 24 so as to be movable in its longitudinal direction. The toothed rack 35 is positively coupled to the drawer 25 by means of a coupling bail 46, which in the end position of the drawer shown in solid lines in FIG. 4 partly engages a hole 47 in the toothed rack 35 and partly engages a hole 48 in the side wall 39 of the drawer 24.

When the motor 32 drives the toothed rack 35 in the direction indicated by the arrow 44 the drawer 24 is driven via the coupling bail 46 and the side wall 39 and is thus moved in the direction indicated by the arrow 44. This movement proceeds until the drawer 24 abuts against the abutment strip 45, as is indicated by the dash-dot lines in FIG. 4 which represent the other end position of the drawer 24. When the drawer 24 has reached this end position the coupling ball 46 is situated opposite a recess 49 in the guide strip 46, into which recess it is pressed by the force exerted on it by the toothed rack 35, as is also shown in dash-dot lines in FIG. 4. When the coupling ball 46 has been pressed into the recess 49 and has consequently left the hole 47 in the toothed rack 35, the toothed rack 35 and the drawer 24 are no longer coupled to one another, thus enabling the movement of the toothed rack 35 to be continued, and in the present apparatus 1 this movement is actually continued because during this continued movement the toothed rack 35 controls the movement of the cassette holder 25 from an intermediate position to an operating position, as will be described hereinafter with reference to FIGS. 6 and 7.

How the cassette holder 25 is movably supported on the drawer 24 and, via the drawer 24, on the chassis 41 will now be described with reference to FIGS. 5 to 7. For movably supporting the cassette holder 25 on the drawer 24, which is movable relative to the chassis 41, the cassette holder 25 is pivotably connected to a first lever 50 by means of a pivot 51 at the location of its narrow side wall 27. The other end of the lever 50 is pivotally connected to the drawer 24 by a further pivot 52. Moreover, at the location of its second narrow side wall 28 the cassette holder 25 is pivotably connected to a second lever 54 via a further pivot formed by a pin-and-slot joint 53, the other end of this lever being pivotably connected to the drawer 24 via a further pivot 55. A control pin 56 projects laterally from the first lever 50 in a direction from the drawer 24 towards the toothed rack 35. The control pin 56 cooperates with a control surface 57 on the toothed rack 35. Likewise, a further control pin 58 projects laterally from the second lever 54 and cooperates with a further control surface 59 on the toothed rack 35. The movement of the cassette holder 25 between the intermediate position shown in FIG. 6 and the operating position shown in FIG. 7 can be controlled by the cooperation of the control pins 56 and 58 with the control surfaces 57 and 59.

The apparatus 1 further comprises a cassette hold-down device 60 supported on the chassis 41 to be pivotable substantially perpendicularly to the upper wall 4 of the cassette 2, as will be apparent from FIGS. 5 to 9.

For pivotably supporting the cassette hold-down device 60 this device 60 comprises a mounting plate 61 having two right-angled mounting lugs 62 which are pivotable about two pivots 63, which are secured to the chassis 41 in a manner not shown, so that the mounting plate 61 and hence the entire cassette hold-down device 60 can be pivoted about a pivotal axis 64. At the end of the mounting plate 61 which is remote from the mounting lugs 62, where the mounting plate 61 has a smaller width, two further mounting lugs 65 project from the mounting plate 61, which mounting lugs are engaged by two trunnions 67 which project laterally from a hold-down support 66 to allow pivotal movement of this support. In the present case the hold-down support 66 takes the form of a hold-down plate. Three hold-down members formed by hold-down rollers 68, 69 and 70 are rotatably supported on the hold-down plate 66 and can cooperate with the upper wall 4 of the cassette 2. When the drawer 24 is in the end position in which it has been slid out of the apparatus 1 the hold-down roller 68 is disposed on a control rib 71 which projects from the upper wall 36 of the drawer 24. Moreover, the hold-down roller 69 is then disposed on a further control rib 72 which projects from the upper wall 36 of the drawer 24. The cooperation of the hold-down rollers 68 and 69 with the control ribs 71 and 72 enables the level of the hold-down plate 66 and, consequently, the hold-down rollers 68, 69 and 70 relative to a cassette 2 inserted into the cassette holder 25 in the drawer 24 to be controlled. In the situation shown in FIG. 5 the control ribs 71 and 72 hold the hold-down plate 66, via the two hold-down rollers 68 and 69, at a level remote from a cassette 2 inserted into the cassette holder 25, the cassette hold-down device 60 then being in its rest position shown in FIG. 5. During a movement of the drawer 24 to its end position shown in FIGS. 6 and 7 the hold-down rollers 68 and 69 roll off the control fibs 71 and 72, upon which they roll across the upper surface 4 of a cassette 2 inserted into the cassette holder 25 and the hold-down plate 66 can assume a position in which it partly covers the upper wall 4 of the cassette 2.

A tension spring 73 acts on the hold-down plate 66 and tends to pull the hold-down plate 66 and consequently the hold-down rollers 68, 69 and 70 against the upper wall 4 of a cassette 2 inserted into the cassette holder 25. Thus, the action of the tension spring 73 ensures that the hold-down rollers 68, 69 and 70 are firmly in contact with the upper wall 4 of a cassette 2, so that the hold-down plate 66 is always held in an accurately defined position relative to the upper wall 4 and hence relative to the entire cassette 2. After the hold-down rollers 68, 69 and 70 have been applied to the upper wall 4 of the cassette 2 the cassette hold-down device 60 can press a cassette 2 inserted into the cassette holder 25 with its lower wall 5 against the bottom wall 26 of the cassette holder 25, as is shown in FIG. 6 in which the cassette hold-down device 60 occupies a first hold-down position. After the cassette holder 25 has been moved from its intermediate position shown in FIG. 6 into its operating position shown in FIG. 7 the hold-down device 60 still presses the cassette 2 against the bottom wall 26 of the cassette holder 25 but in this operating position the cassette 2 is supported by locating pins 74, 75 and 76 which project through openings in the bottom wall 26 of the cassette holder 25, as is shown diagrammatically in dash-dot lines in FIG. 7, in which the hold-down device 60 occupies a second hold-down position. The cooperation of the locating pins 74, 75 and 76 with the lower wall 5 of the cassette 2 defines an exact operating position for the cassette 2, which is essential for a correct cooperation of the magnetic head with the magnetic tape 15 in the cassette 2.

The apparatus 1 comprises an actuating device 77 for actuating the shutter 16 of the cassette 2 held in the cassette holder 25. In the present apparatus 1 the actuating device 77 is movably supported on the hold-down plate 66 of the cassette hold-down device 60 in an advantageous manner. The actuating device 77 includes a movable supporting lever 78 which partly covers the upper wall 4 of the cassette 2 and which is formed by a plate-shaped actuating lever extending parallel to the hold-down plate 66, which lever is mounted on the hold-down plate 66 so as to be pivotable about a pivot 79. In the present case the pivot 79 is constituted by a pin-and-slot joint, the pin 80 being movable in the slot 81 of the pin-and-slot joint 79 in a direction substantially parallel to the first direction of movement 22. The actuating device 77 also includes an actuating member 82 in the form of a cylindrical actuating pin which projects from the plate-shaped supporting lever 78 forming the supporting member and which is engageable with the shutter 16 of the cassette 2 after the hold-down rollers 68, 69 and 70 have been applied to the upper wall 4 of the cassette 2.

Figures 6, 7, 9:
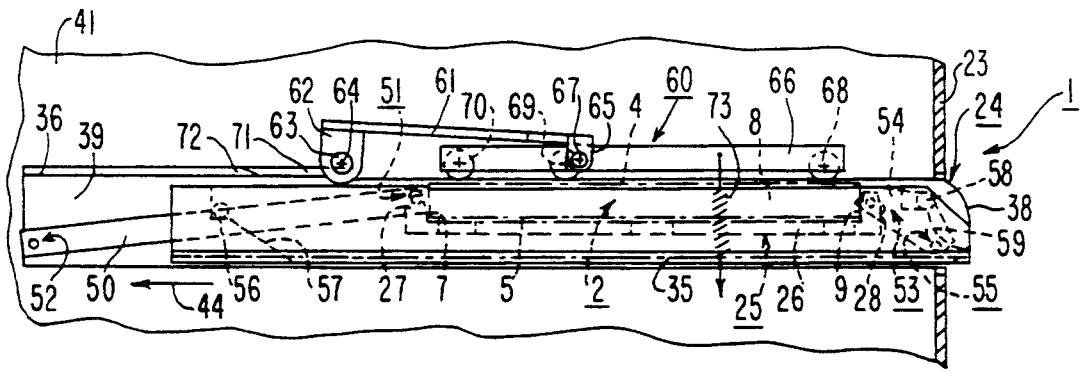
FIG. 6 shows in the same way as FIG. 5 a part of the apparatus shown in FIGS. 1, 4 and 5, the drawer being shown in an end position in which it has been slid into the apparatus, the cassette holder being shown in an intermediate position, and the cassette hold-down device being shown in a first hold-down position in which it already acts upon a cassette.
FIG. 7 shows in the same ways as FIGS. 5 and 6 the same part of the apparatus of FIGS. 1, 4, 5 and 6 as shown in FIGS. 5 and 6, the drawer of the apparatus being shown in its end position in which it has been slid into the apparatus, the cassette holder being shown in an operating position, and the cassette hold-down device being shown in a second hold-down position in which it acts upon a cassette.
FIG. 9 shows in the same ways as FIG. 8 the same part of the apparatus of FIGS. 1 and 4 to 8 as shown in FIG. 8, the drawer of the apparatus being shown in its end position in which it has been slid into the apparatus.

Moreover, there has been provided a control device 83 for the actuating device 77 supported by the hold-down plate 66 of the hold-down device 60, which control device causes the actuating device 77 to assume a position for the cooperation of the actuating member 82 with the shutter 16 of the cassette 2 when the cassette holder 25 is moved parallel to the first direction of movement 22 from its loading position shown in FIG. 5 to its intermediate position shown in FIG. 6 after the hold-down rollers 68, 69 and 70 have been applied to the upper wall 4 of the cassette 2, in order to move the shutter 16 parallel to the first direction of movement 22 from its closed position to its open position. The control device 83 for the actuating device 77 is constituted by an inclined control wall 84 in the form of a lateral bounding wall of a control rib 85 connected to the drawer 24 and projecting from the upper wall 36 of the drawer 24. A control projection 86 projects from the plate-shaped actuating lever 78 towards the upper wall 36 of the drawer 24 and cooperates with the control wall 84 forming the control device 83. Moreover, an actuating spring 87 for the actuating lever acts upon the hold-down plate 66 and on the plate-shaped lever 78 to press the control projection 86 of the supporting lever 78 against the inclined control wall 84.

The operation of the apparatus 1 in relation to the present invention will be described hereinafter. When the drawer 24 is in its end position outside the apparatus 1, as is shown in FIGS. 1, 4 and 5, a cassette 2 is inserted into the cassette holder 25, which is then in its loading position shown in FIG. 5. Subsequently, the drawer 24 is driven by means of the motor 32 and is moved in the direction indicated by the arrow 44 via the toothed rack 35, the cassette holder 25 then being moved parallel to the upper wall 4 of the cassette 2 between its loading position and an intermediate position shown in FIG. 6. During this movement of the drawer 24 the hold-down rollers 68 and 69 roll down the control ribs 71 and 72 and onto the upper wall 4 of the cassette 2 inserted into the cassette holder 25, so that the hold-down plate 66 with its hold-down rollers 68, 69 and 70 is lowered onto the upper wall 4 of the cassette 2 and the cassette 2 is urged against the bottom wall 26 of the cassette holder 25 under the influence of the tension spring 73 which acts upon the hold-down plate 66. Subsequently, the drawer 24 reaches its other end position in which it abuts against the abutment strip 45, as is shown in FIG. 6. In this situation the cassette holder 25 occupies its intermediate position.

Now the coupling between the toothed rack 35 and the drawer 24, formed by means of the coupling ball 46, is disengaged. After this, the toothed rack 35 is moved from the position shown in FIG. 6 into the position shown in FIG. 7. The control pins 56 and 58 which project laterally from the two levers 50 and 54 now slide along the control surfaces 57 and 59 provided on the toothed rack 35, the force exerted on the cassette 2 and hence on the cassette holder 25 by the tension spring 73 via the hold-down plate 66 and the hold-down rollers 68, 69 and 70 causing the cassette holder 25 together with the cassette 2 contained in the holder and the cassette hold-down device 60 to be moved substantially perpendicularly to the upper wall 4 of the cassette 2 into the positions illustrated in FIG. 7. In this case the cassette holder 25 then occupies its operating position, in which the cassette 2 situated in the cassette holder 25 is supported by the locating pins 74, 75 and 76 has a slight clearance relative to the bottom wall 26 of the cassette holder 25. After the above-mentioned apparatus parts have assumed the positions shown in FIG. 7 the motor is switched off via a switch, not shown, which can be actuated by means of the toothed rack 35.

Figure 8:
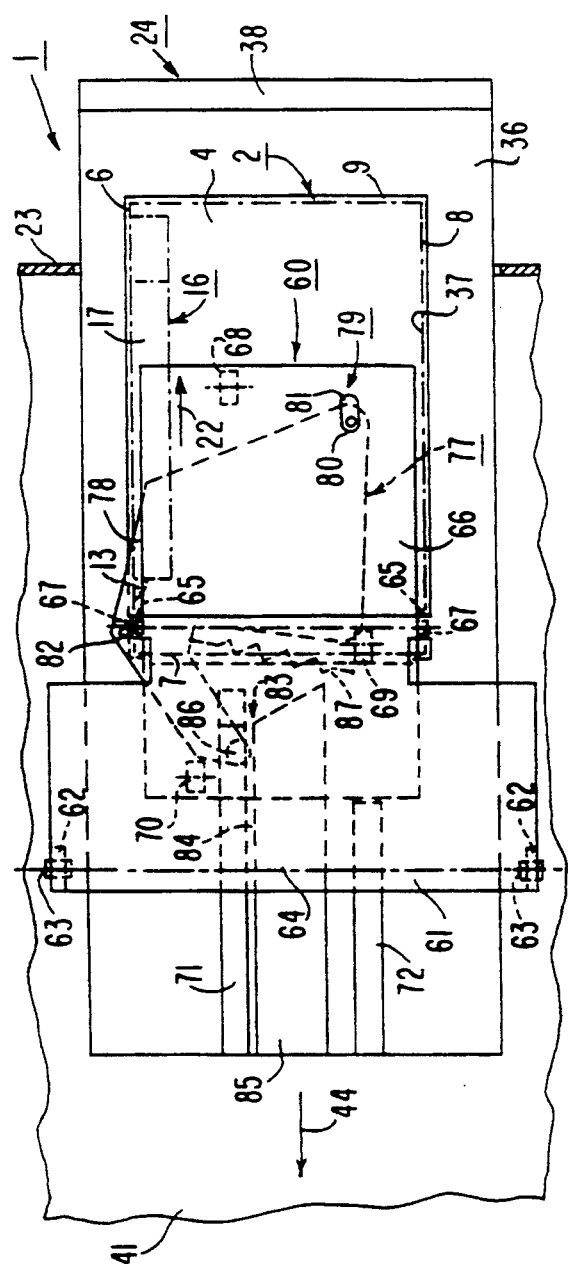
FIG. 8 shows the same part of the apparatus as FIGS. 5, 6 and 7 to the same scale as in FIGS. 5, 6 and 7 but in a plan view of the drawer of the apparatus, the drawer being shown in an intermediate position situated between its two end positions.

The following serves to explain the operation of the actuating device 77 for the shutter 16 of the cassette 2. As described above, the hold-down rollers 68, 69 and 70 enter into operative contact with the upper wall 4 of a cassette 2 inserted into the cassette holder 25 during the movement of the drawer 24 from its end position shown in FIG. 5 to its end position shown in FIG. 6. FIG. 8 shows an intermediate position of the drawer 24, in which the hold-down roller 68 has rolled off the control rib 71 and the hold-down roller 69 has rolled off the control rib 72 and the hold-down rollers 68 and 69 are already in operative contact with the upper wall 4 of the cassette 2, so that the hold-down plate 66 already occupies an accurately defined position relative to the upper wall 4 of the cassette 2. In this intermediate position shown in FIG. 8 the control projection 86 of the actuating device 77 is still in engagement with the control wall 84. As the movement of the drawer 24 in the direction indicated by the arrow, 4 proceeds the inclined end portion of the control wall 84 approaches the control projection 86, the wall portion 13 with the access opening 10 of the cassette 2 then being situated already at the location of the actuating pin 82. Subsequently, the control wall 84 liberates the control projection 86, so that the actuating lever 77 together with the actuating pin 82 projecting from it is pivoted under the influence of the actuating spring 87, the actuating pin 82 engaging the access opening 10 of the cassette 2 at the location of the wall portion 13 to cooperate with the shutter 16 of the cassette 2. As the movement of the drawer 24 in the direction indicated by the arrow 44 continues the cassette shutter 16 is moved from its closed position shown in FIG. 8 to its open position shown in FIG. 9 owing to the relative movement between the actuating pin 82 and the cassette 2. Thus, this movement of the shutter 16 to its open position is already performed during the movement of the cassette holder 25, which is movably supported by the drawer 24, from its loading position shown in FIG. 5 to its intermediate position shown in FIG. 6.

When the shutter 16 of the cassette 2 is in its open position the actuating pin 82 is clamped between the wall portion 14 of the cassette 2 and the end of the shutter 16 situated opposite this wall portion 14. When the cassette holder 25 is moved from its intermediate position shown in FIG. 6, in which the shutter 16 of the cassette 2 already occupies its open position, to its operating position shown in FIG. 7 a small relative movement parallel to the upper wall 4 of the cassette 2 is performed between the hold-down plate 66 and the supporting lever 78, which is pivotally connected thereto, on the one hand, and the cassette 2 on the other hand, as a result of which the actuating pin 82 would exert a force on the cassette 2. In order to preclude this the pivotal coupling of the supporting lever 78 to the hold-down plate 66 is constituted by the pin-and-slot joint 79, which allows a relative movement between the pin 80 and the slot 81 parallel to the direction of movement 22 of the shutter 16. When the cassette holder 25 has been lowered into its operating position the pin 80 of the pin-and-slot joint 79 is clear of the end of the slot 81 as a result of said relative movement, so that no external forces can be exerted on the supporting lever 78 and, consequently via the actuating pin 82, on the cassette 2 via the pin-and-slot joint.

Since the actuating device 77 of the present apparatus 1 has been arranged on the hold-down support 66 it is achieved very simply that the upper wall 4 of a cassette 2 which has been inserted into the cassette holder 25 and whose shutter 16 should be opened and should subsequently be closed, forms a reference surface to define the position of the actuating device 77 for the shutter 16 relative to the cassette 2, resulting in a relative position of the actuating member 82 of the actuating device 77 with respect to the shutter 16 of the cassette 2 which lies within a very narrow tolerance range. This very narrow tolerance range of said relative position nearly always ensures a reliable actuating function for the shutter 16 of the cassette 2.

The invention is not limited to the exemplary embodiment described above, other modified embodiments being also possible. For example, the invention may also be used in an apparatus comprising a cassette holder which is stationarily secured to or supported on the chassis of the apparatus and which can be closed by a cover which is pivotably connected to the apparatus housing and which carries on its inner side a cassette hold-down device including an actuating device which is movably supported on said cover. Likewise, the invention may be used in an apparatus having a cassette holder which is pivotable about a pivotal axis. The hold-down device may also be of another construction. Moreover, modified constructions for the actuating device are possible.

We claim:

1. A recording and/or reproducing apparatus for a magnetic-tape cassette comprising a rectangular housing having an upper wall, a lower wall and four side walls, at least one of said side walls having at least one access opening, and a shutter for closing the access opening, which shutter is movable between a closed position and an open position, which apparatus comprises a chassis, a cassette holder supported on the chassis and adapted to receive a cassette, and an actuating device adapted to move the shutter of the cassette held by the cassette holder; which actuating device comprises a supporting member, at least partly covering the upper wall of the cassette, and an actuating member which projects from the supporting member and which is engageable with the shutter of the cassette, which actuating member controls the movement of the shutter during a relative movement between said actuating member and the shutter, wherein the improvement comprises there is provided a movably supported hold-down device comprising a hold-down support which is movable into a position in which it at least partly covers the upper wall of the cassette and which comprises at least one hold-down member which can be applied to the upper wall of the cassette, and by means of which a cassette inserted into the cassette holder can be pressed against the cassette holder with its lower wall after the hold-down member has been applied to its upper wall, and the actuating device is movably connected to the hold-down support of the hold-down device and, after the hold-down member has been applied to the upper wall of the cassette, the actuating member of the actuating device is engageable with the shutter of the cassette.

2. An apparatus as claimed in claim 1, for a magnetic-tape cassette comprising a shutter which is slidable along a side wall of the cassette parallel to a first direction of movement, wherein the cassette holder is movably supported on the chassis and is movable between a loading position and an intermediate position in a direction parallel to the upper wall of the cassette and parallel to the first direction of movement and between the intermediate position and an operating position in a direction perpendicular to the upper wall of the cassette, the hold-down support is supported on the chassis so as to be movable substantially perpendicularly to the upper wall of the cassette and, when the cassette holder is moved from its loading position to its intermediate position, the hold-down member of said hold-down support is applied to the upper wall of the cassette, and there is provided a control device for the actuating device supported by the hold-down support of the hold-down device, which control device causes the actuating device to assume a position for the cooperation of the actuating member with the shutter of the cassette when the cassette holder is moved parallel to the first direction of movement from its loading position to its intermediate position after the hold-down member has been applied to the upper wall of the cassette, in order to move the shutter parallel to the first direction of movement from its closed position to its open position.

3. An apparatus as claimed in claim 2, wherein in that the hold-down support of the hold-down device is essentially formed by a hold-down plate (66) which at least largely covers the upper wall of the cassette when the hold-down member has been applied to the upper wall, and the actuating device which is movably supported on the hold-down plate comprises a substantially plate-shaped supporting lever which is arranged to extend parallel to the hold-down plate and is supported on the hold-down plate (66) so as to be pivotable about a pivot.

4. An apparatus as claimed in claim 3, wherein an actuating pin forming the actuating member and a control projection adapted to cooperate with the control device for the actuating device project substantially perpendicularly from the plate-shaped supporting lever.

5. An apparatus as claimed in claim 4, wherein there is provided an actuating spring for the supporting lever, which spring acts upon the hold-down plate and upon the plate-shaped supporting lever, and the control device for the actuating device comprises an inclined control wall against which the control projection of the supporting lever can be pressed by the force of the actuating spring.

6. An apparatus as claimed in claim 5, wherein the pivot between the plate-shaped supporting lever and the hold-down plate is formed by a pin-and-slot joint, and the pin is movable in the slot parallel to the first direction of movement.

7. An apparatus as claimed in claim 4, wherein the pivot between the plate-shaped supporting lever and the hold-down plate is formed by a pin-and-slot joint, and the pin is movable in the slot parallel to the first direction of movement.

8. An apparatus as claimed in claim 3, wherein the pivot between the plate-shaped supporting lever and the hold-down plate is formed by a pin-and-slot joint, and the pin is movable in the slot parallel to the first direction of movement.

* * * * *